US007653479B2

(12) United States Patent
Murakami

(10) Patent No.: US 7,653,479 B2
(45) Date of Patent: Jan. 26, 2010

(54) CONTROL DEVICE OF INTERNAL COMBUSTION ENGINE

(75) Inventor: Yoshifumi Murakami, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/273,054

(22) Filed: Nov. 18, 2008

(65) Prior Publication Data

US 2009/0138176 A1 May 28, 2009

(30) Foreign Application Priority Data

Nov. 27, 2007 (JP) ............................ 2007-305242

(51) Int. Cl.
*G06F 19/00* (2006.01)
*F02P 5/00* (2006.01)

(52) U.S. Cl. .................. 701/112; 701/114; 123/406.15; 123/406.47

(58) Field of Classification Search ................. 701/103, 701/104, 105, 112, 114; 123/399, 406.13, 123/406.15, 406.16, 406.25, 406.47, 481, 123/198 F
See application file for complete search history.

(56) References Cited

U.S. PATENT DOCUMENTS 5,146,892 A 9/1992 Krampe et al.
5,970,952 A * 10/1999 Mogi et al. ............ 123/406.27
6,810,320 B2 * 10/2004 Yamamoto et al. .......... 701/111
2003/0070423 A1 * 4/2003 Morinaga et al. ............. 60/284
2005/0211207 A1 * 9/2005 Urushihata et al. ....... 123/90.17
2007/0073470 A1 3/2007 Watanabe et al.
2008/0228374 A1 * 9/2008 Ishizuka et al. ............. 701/103

FOREIGN PATENT DOCUMENTS

JP 2006-118519 5/2006

OTHER PUBLICATIONS

Japanese Office Action dated Sep. 15, 2009, issued in counterpart Japanese Application No. 2007-305242, with English translation.

* cited by examiner

*Primary Examiner*—John T Kwon
(74) *Attorney, Agent, or Firm*—Nixon & Vanderhye, PC

(57) ABSTRACT

A fuel cut failsafe function monitoring section of a microcomputer sets a fuel cut failsafe function diagnosis period in a period, in which an operation of an engine is stopped (e.g., a period before engine start), and sends a fuel cut failsafe execution command signal to a fuel cut failsafe execution section of an abnormality monitoring device during the fuel cut failsafe function diagnosis period. Thus, the fuel cut failsafe execution section is caused to output a fuel cut failsafe signal to an injector driver to stop an operation of the injector driver. The fuel cut failsafe function monitoring section monitors an output level of a disablement port of the injector driver at the time, thereby performing abnormality diagnosis of a fuel cut failsafe function.

4 Claims, 5 Drawing Sheets

CONTROL DEVICE OF INTERNAL COMBUSTION ENGINE

CROSS REFERENCE TO RELATED APPLICATION

This application is based on and incorporates herein by reference Japanese Patent Application No. 2007-305242 filed on Nov. 27, 2007.

BACKGROUND OF THE INVENTION

1. Field of the Invention

The present invention relates to a control device of an internal combustion engine that monitors an operating state of a microcomputer controlling at least a fuel injection device and that activates a fuel cut failsafe function when an abnormality in the microcomputer is detected.

2. Description of Related Art

A control device of this kind for an internal combustion engine is described in Patent document 1 (PCT application Japanese translation No. H4-500846), for example. The control device compulsorily activates a fuel cut failsafe function when deceleration fuel cut (i.e., fuel cut during deceleration) is performed during running of a vehicle and monitors an operation state of the fuel cut failsafe function. Thus, the control device aims to perform abnormality diagnosis of the fuel cut failsafe function without affecting drivability during the running of the vehicle.

However, since the control device described in above Patent document 1 performs the abnormality diagnosis of the fuel cut failsafe function during the deceleration fuel cut period in the running of the vehicle, the vehicle runs in a state where the abnormality diagnosis of the fuel cut failsafe function is not performed during a period since the running of the vehicle is started until the deceleration fuel cut is performed. Therefore, the vehicle running is performed without detecting the abnormality even if the fuel cut failsafe function is abnormal during the period since the running of the vehicle is started until the deceleration fuel cut is performed.

SUMMARY OF THE INVENTION

It is an object of the present invention to provide a control device of an internal combustion engine capable of performing abnormality diagnosis of a fuel cut failsafe function before a driver starts running of a vehicle, thereby avoiding the running of the vehicle in a state where the fuel cut failsafe function is abnormal.

According to an aspect of the present invention, a control device of an internal combustion engine has a microcomputer and an abnormality monitoring device. The microcomputer controls at least a fuel injection device of the internal combustion engine. The abnormality monitoring device monitors an operation state of the microcomputer and activates a fuel cut failsafe function by outputting a fuel cut failsafe signal to the fuel injection device to compulsorily stop fuel injection of cylinders when the abnormality monitoring device detects an abnormality in the microcomputer. The microcomputer has a fuel cut failsafe function monitoring section that sets a fuel cut failsafe function diagnosis period in a period in which an operation of the internal combustion engine is stopped, that causes the abnormality monitoring device to output the fuel cut failsafe signal to the fuel injection device during the fuel cut failsafe function diagnosis period, and that monitors a signal state of an operation state monitoring port of the fuel injection device at the time, thereby performing abnormality diagnosis of the fuel cut failsafe function. With such the construction, the abnormality diagnosis of the fuel cut failsafe function can be performed before the driver starts running of the vehicle. Accordingly, the running of the vehicle in a state where the fuel cut failsafe function is abnormal can be avoided.

According to the present invention, the fuel cut failsafe function diagnosis period may be set arbitrarily in the period in which the operation of the internal combustion engine is stopped. Therefore, for example, the fuel cut failsafe function diagnosis period may be set in a period in which a main relay of a power supply circuit is maintained at an ON state for a while after the internal combustion engine stops (i.e., an ON period of the main relay after the stop of the internal combustion engine).

However, if an engine stoppage time lengthens when the fuel cut failsafe function diagnosis period is set in the ON period of the main relay after the stop of the internal combustion engine, there is a possibility that an abnormality is caused in the fuel cut failsafe function by some causes during the stoppage of the internal combustion engine.

Therefore, according to another aspect of the present invention, the fuel cut failsafe function monitoring section sets the fuel cut failsafe function diagnosis period in a period since a switching-on operation (i.e., ON operation) of an ignition switch of the internal combustion engine is performed until start of the internal combustion engine is commenced. Thus, even if the abnormality is caused in the fuel cut failsafe function by some causes during the stoppage of the internal combustion engine, the abnormality in the fuel cut failsafe function can be detected in the period since the ON operation of the ignition switch is performed until the start of the internal combustion engine is commenced after the occurrence of the abnormality. Accordingly, the running of the vehicle in a state where the fuel cut failsafe function is abnormal can be surely avoided.

According to another aspect of the present invention, the fuel cut failsafe function monitoring section directs the abnormality monitoring device to output the fuel cut failsafe signal during the fuel cut failsafe function diagnosis period, thereby causing the abnormality monitoring device to output the fuel cut failsafe signal to the fuel injection device. With such the construction, the abnormality monitoring device can be caused to output the fuel cut failsafe signal to the fuel injection device by simple processing.

In the case where the microcomputer has a test execution section for testing an operation of the microcomputer, according to yet another aspect of the present invention, the fuel cut failsafe function monitoring section causes the test execution section to output an abnormal test result to the abnormality monitoring device during the fuel cut failsafe function diagnosis period to provide a state where the abnormality monitoring device detects the abnormality in the microcomputer, thereby causing the abnormality monitoring device to output the fuel cut failsafe signal to the fuel injection device. With such the construction, it can be additionally determined whether both of the test execution section of the microcomputer and an abnormality determination section of the abnormality monitoring device function normally when performing the abnormality diagnosis of the fuel cut failsafe function.

BRIEF DESCRIPTION OF THE DRAWINGS

Features and advantages of embodiments will be appreciated, as well as methods of operation and the function of the related parts, from a study of the following detailed description, the appended claims, and the drawings all of which form a part of this application. In the drawings:

DETAILED DESCRIPTION OF EXAMPLE EMBODIMENTS

Hereafter, two embodiments of the present invention will be described with reference to the drawings.

Figure 1:
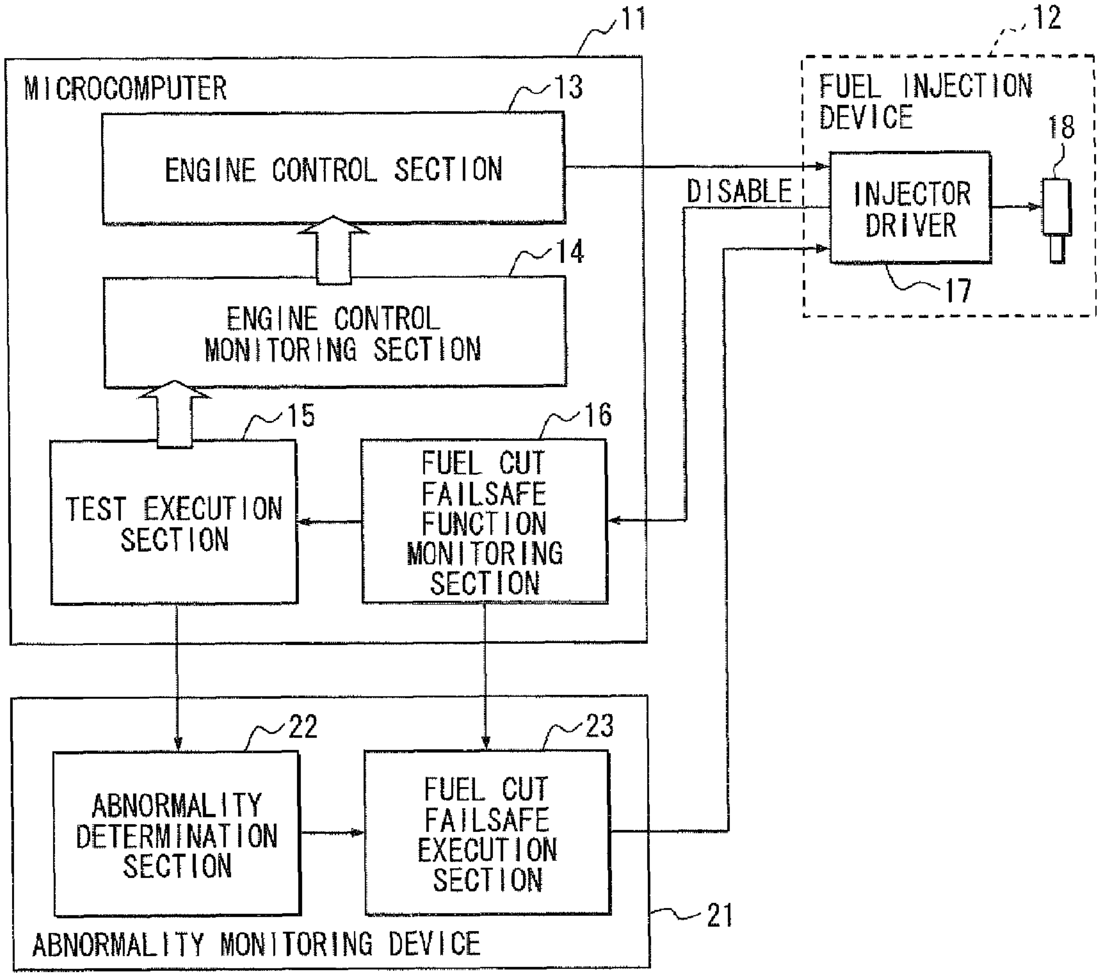
FIG. 1 is a block diagram showing a system configuration according to first and second embodiments of the present invention.

A first embodiment of the present invention will be described below with reference to FIGS. 1 to 3. First, an entire system configuration will be explained with reference to FIG. 1.

A microcomputer 11 (CPU) has functions of an engine control section 13 controlling a fuel injection device 12 and the like, an engine control monitoring section 14 monitoring an operation state of the engine control section 13, a test execution section 15 testing an operation of the microcomputer 11, a fuel cut failsafe function monitoring section 16 performing an abnormality diagnosis of a fuel cut failsafe function, and the like. The microcomputer 11 realizes the functions with various programs stored in ROM (not shown). The engine control section 13 may control at least one of an electronic throttle device, a variable valve device, an EGR device and the like of an engine (an internal combustion engine, not shown) in addition to the fuel injection device 12, for example.

The fuel injection device 12 consists of an injector driver 17, into which an injection signal is inputted from the engine control section 13, and injectors 18 of respective cylinders driven by the injector driver 17. The single injector driver 17 drives the injectors 18 of all the cylinders.

An abnormality monitoring device 21 has functions of an abnormality determination section 22 that monitors an operation state of the microcomputer 11 and determines existence/nonexistence of an abnormality in the microcomputer 11, a fuel cut failsafe execution section 23 that activates a fuel cut failsafe function by outputting a fuel cut failsafe signal to the injector driver 17 for compulsorily stopping the fuel injection of the cylinders when the abnormality determination section 22 detects the abnormality in the microcomputer 11, and the like. The abnormality monitoring device 21 may be constituted of an abnormality monitoring IC or may be constituted of a microcomputer (CPU) separate from the microcomputer 11.

In the present embodiment, the fuel cut failsafe function monitoring section 16 of the microcomputer 11 sets a fuel cut failsafe function diagnosis period in a period, in which operation of the engine is stopped. The fuel cut failsafe function monitoring section 16 outputs a fuel cut failsafe execution command signal to the fuel cut failsafe execution section 23 of the abnormality monitoring device 21 during the fuel cut failsafe function diagnosis period. Thus, the fuel cut failsafe function monitoring section 16 causes the fuel cut failsafe execution section 23 to output a fuel cut failsafe signal to the injector driver 17 to stop the operation of the injector driver 17. The fuel cut failsafe function monitoring section 16 monitors an output level of a disablement port (an operation state monitoring port) indicating an operation state of the injector driver 17 at the time. Thus, the fuel cut failsafe function monitoring section 16 performs abnormality diagnosis of the fuel cut failsafe function.

According to the present invention, the fuel cut failsafe function diagnosis period may be set arbitrarily in the period, in which the operation of the engine is stopped. Therefore, for example, the fuel cut failsafe function diagnosis period may be set in a period, in which a main relay of a power supply circuit (not shown) is maintained at an ON state for a while after the engine stops (i.e., an ON period of the main relay after the engine stop).

However, if an engine stoppage time lengthens when the fuel cut failsafe function diagnosis period is set in the ON period of the main relay after the engine stop, there is a possibility that an abnormality is caused in the fuel cut failsafe function by some causes during the engine stoppage.

Therefore, in the first embodiment, the fuel cut failsafe function diagnosis period is set in a period since ON operation (i.e., switching-on operation) of an ignition switch (not shown) is performed until engine start is commenced. Thus, even if the abnormality is caused in the fuel cut failsafe function by some causes during the engine stoppage, the abnormality in the fuel cut failsafe function can be detected in the period since the ON operation of the ignition switch is performed until the engine start is commenced after the occurrence of the abnormality.

The above-described abnormality diagnosis of the fuel cut failsafe function according to the first embodiment is performed by the microcomputer 11 as follows according to a fuel cut failsafe function abnormality diagnosis program shown in FIG. 2. The program is executed in a predetermined cycle during an ON period of a power supply to the microcomputer 11 (i.e., during the ON period of the main relay of the power supply circuit).

If the program is started, first in S101 (S means “Step”), it is determined whether an IG flag is ON, which indicates an ON state of the ignition switch. If the IG flag is OFF, which indicates an OFF state of the ignition switch, it is determined that the abnormality diagnosis of the fuel cut failsafe function is prohibited, and the program is ended without executing subsequent processing.

If it is determined in S101 that the IG flag is ON, the process proceeds to S102, in which it is determined whether the current state is before the engine start. If the current state is not before the engine start, it is determined that the abnormality diagnosis of the fuel cut failsafe function is prohibited, and the program is ended without executing subsequent processing.

If both of S101 and S102 are YES, it is determined that the current state is in the fuel cut failsafe function diagnosis period in which the abnormality diagnosis of the fuel cut failsafe function is permitted, and the process proceeds to S103. In S103, a fuel cut failsafe function monitoring execution flag is set to ON to activate the fuel cut failsafe function monitoring section 16.

Then, the process proceeds to S104, in which a fuel cut failsafe execution flag is set to ON to cause the fuel cut failsafe function monitoring section 16 to send a fuel cut failsafe execution command signal to the fuel cut failsafe execution section 23 of the abnormality monitoring device 21. Thus, the fuel cut failsafe execution section 23 is caused to output a fuel cut failsafe signal to the injector driver 17 to stop the operation of the injector driver 17. The fuel cut failsafe function monitoring section 16 monitors the output level of the disablement port of the injector driver 17 at the time.

When the fuel cut failsafe function is normal, the output level of the disablement port becomes H level, and a disablement flag is set to ON. When the fuel cut failsafe function is abnormal, the output level of the disablement port is not changed from L level, and the disablement flag is maintained at OFF.

In following S105, it is determined whether the fuel cut failsafe function is normal based on whether the disablement flag is ON. When the disablement flag is ON, it is determined that the fuel cut failsafe function is normal, and an abnormality flag is maintained at OFF in S106. When the disablement flag is OFF, it is determined that the fuel cut failsafe function is abnormal, and the abnormality flag is set to ON in S107.

If the abnormality flag is maintained at OFF when the abnormality diagnosis of the fuel cut failsafe function ends, the start of the engine (i.e., energization to a starter) is permitted promptly. If the abnormality flag is set at ON when the abnormality diagnosis of the fuel cut failsafe function ends, the start of the engine is prohibited.

Figure 2:
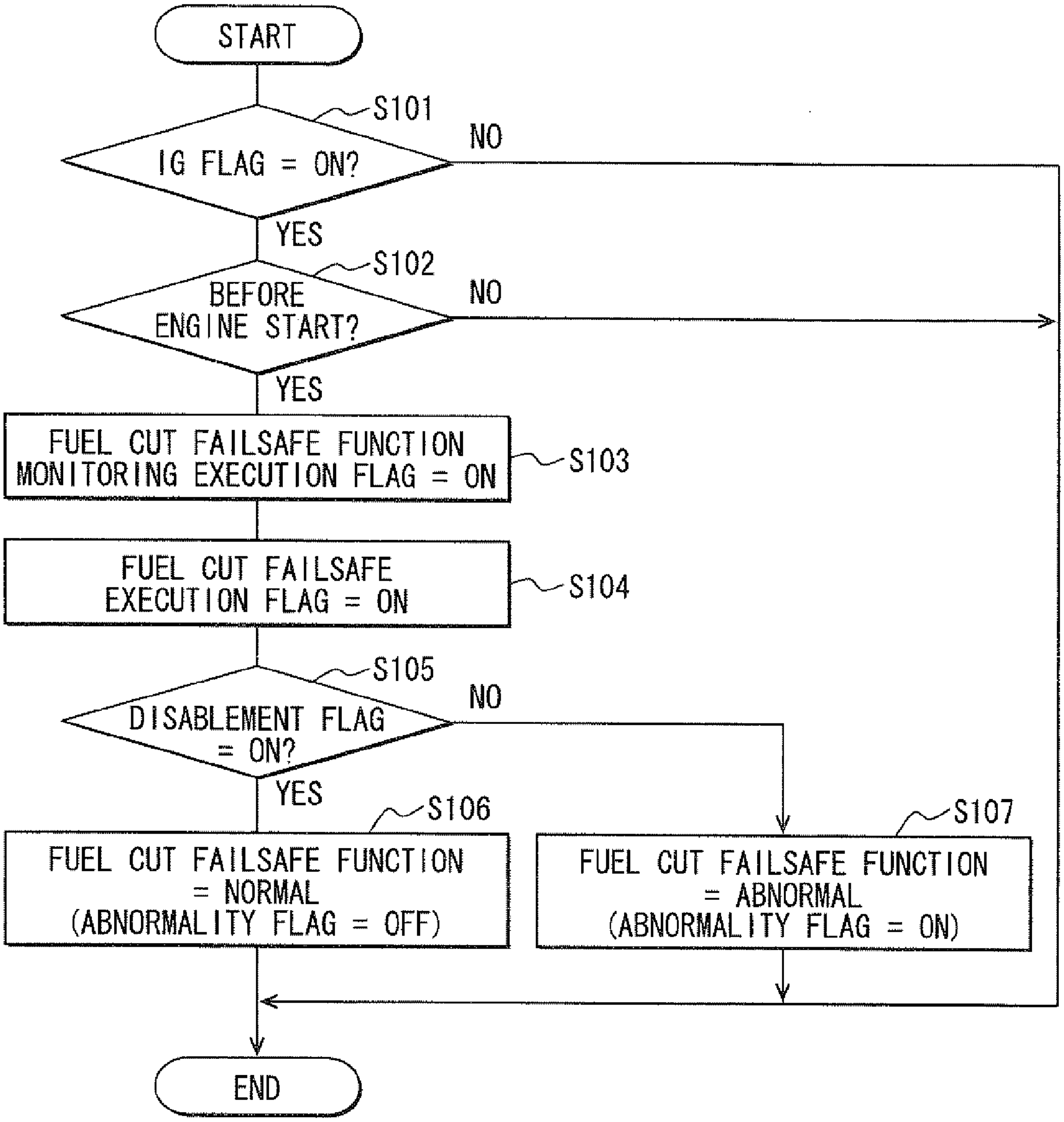
FIG. 2 is a flowchart showing a processing flow of a fuel cut failsafe function abnormality diagnosis program according to the first embodiment.
Figure 3:
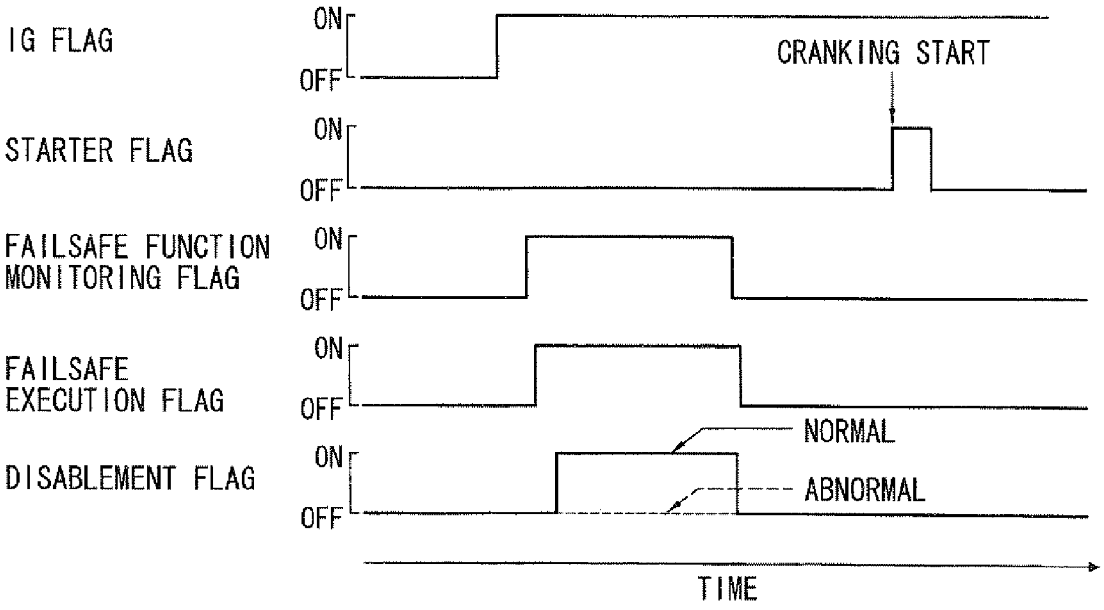
FIG. 3 is a time chart showing an execution example of fuel cut failsafe function abnormality diagnosis according to the first embodiment.

A time chart of FIG. 3 shows an execution example of the above-described fuel cut failsafe function abnormality diagnosis program of FIG. 2. As shown in FIG. 3, the fuel cut failsafe function monitoring execution flag (FAILSAFE FUNCTION MONITORING FLAG in FIG. 3) and the fuel cut failsafe execution flag (FAILSAFE EXECUTION FLAG in FIG. 3) are set to ON respectively immediately after the driver performs the ON operation of the ignition switch and the IG flag is switched from OFF to ON. Thus, the fuel cut failsafe function monitoring section 16 sends the fuel cut failsafe execution command signal to the fuel cut failsafe execution section 23 of the abnormality monitoring device 21, thereby performing the abnormality diagnosis of the fuel cut failsafe function.

Thus, the fuel cut failsafe execution section 23 of the abnormality monitoring device 21 outputs the fuel cut failsafe signal to the injector driver 17 to stop the operation of the injector driver 17. The output level of the disablement port of the injector driver 17 at the time is read into the microcomputer 11. If the fuel cut failsafe function is normal, the output level of the disablement port is at the H level, and the disablement flag is set to ON. If the fuel cut failsafe function is abnormal, the output level of the disablement port does not change from the L level, and the disablement flag is maintained at OFF. Using the relationship, it is determined whether the fuel cut failsafe function is normal based on whether the disablement flag is ON.

If it is determined that the fuel cut failsafe function is normal as the result, a start permission state is established promptly. If the driver performs the starting operation in this state, a starter (not shown) is energized promptly and the engine is started.

According to the above-described first embodiment, the fuel cut failsafe function diagnosis period is set in the period (the period before the engine start), in which the operation of the engine is stopped. The fuel cut failsafe execution command signal is sent to the fuel cut failsafe execution section 23 of the abnormality monitoring device 21 during the fuel cut failsafe function diagnosis period. Thus, the fuel cut failsafe execution section 23 is caused to output the fuel cut failsafe signal to the injector driver 17. The output level of the disablement port of the injector driver 17 at the time is monitored. Thus, the abnormality diagnosis of the fuel cut failsafe function is performed. Accordingly, the abnormality diagnosis of the fuel cut failsafe function can be performed before the driver starts running of the vehicle. As a result, the running of the vehicle in a state where the fuel cut failsafe function is abnormal can be avoided.

Moreover, according to the first embodiment, the abnormality diagnosis of the fuel cut failsafe function is performed in the period since the ON operation of the ignition switch is performed until the engine start is commenced. Accordingly, even when the abnormality is caused in the fuel cut failsafe function by some causes during the engine stoppage, the abnormality in the fuel cut failsafe function can be detected in the period since the ON operation of the ignition switch is performed until the engine start is commenced after the occurrence of the abnormality. Accordingly, the running of the vehicle in the state where the fuel cut failsafe function is abnormal can be surely avoided.

The fuel cut failsafe execution section 23 of the abnormality monitoring device 21 outputs the fuel cut failsafe signal to the injector driver 17 to stop the operation of the injector driver 17. Accordingly, the fuel cut failsafe of all the cylinders can be checked at the same time, thereby quickly performing the abnormality diagnosis of the fuel cut failsafe function.

Next, the second embodiment of the present invention will be explained.

In the above-described first embodiment, the fuel cut failsafe function monitoring section 16 of the microcomputer 11 sends the fuel cut failsafe execution command signal to the fuel cut failsafe execution section 23 of the abnormality monitoring device 21 during the fuel cut failsafe function diagnosis period. Thus, the fuel cut failsafe execution section 23 is caused to output the fuel cut failsafe signal to the injector driver 17 to perform the abnormality diagnosis of the fuel cut failsafe function.

Figure 4:
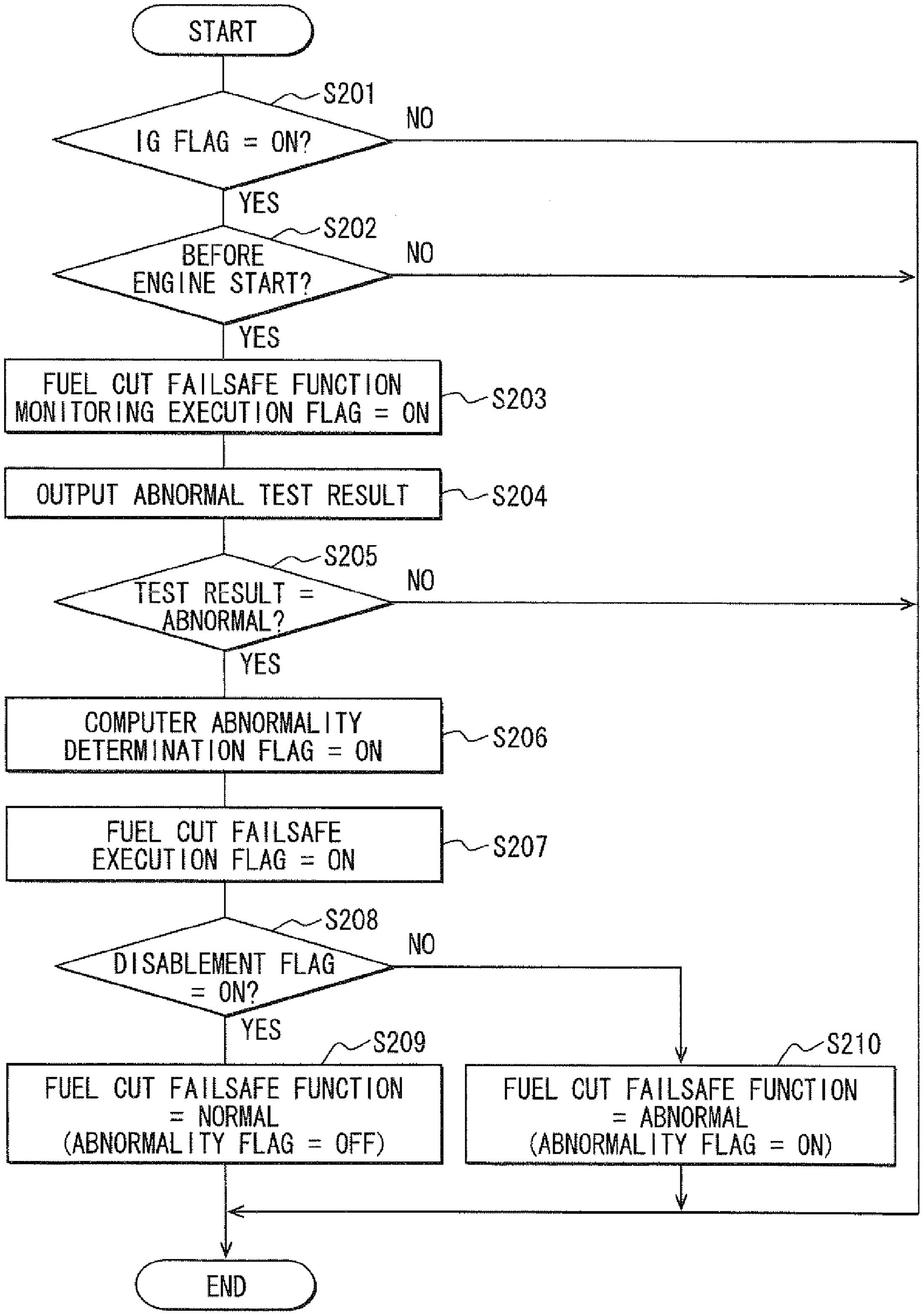
FIG. 4 is a flowchart showing a processing flow of a fuel cut failsafe function abnormality diagnosis program according to the second embodiment.
Figure 5:
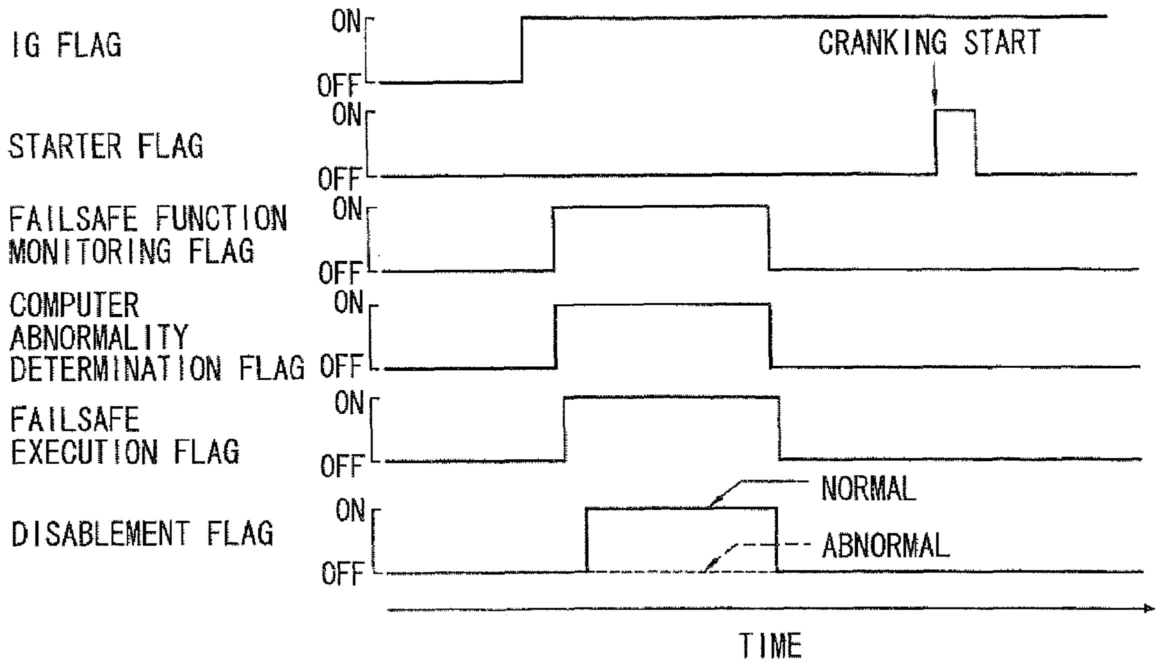
FIG. 5 is a time chart showing an execution example of fuel cut failsafe function abnormality diagnosis according to the second embodiment.

The second embodiment of the present invention shown in FIGS. 4 and 5 uses the test execution section 15 of the microcomputer 11. That is, the fuel cut failsafe function monitoring section 16 of the microcomputer 11 according to the second embodiment causes the test execution section 15 to send an abnormal test result to the abnormality determination section 22 of the abnormality monitoring device 21 during the fuel cut failsafe function diagnosis period, providing a state where the abnormality determination section 22 detects the abnormality in the microcomputer 11. Thus, the fuel cut failsafe execution section 23 of the abnormality monitoring device 21 is caused to output the fuel cut failsafe signal to the injector driver 17. The other construction is the same as the first embodiment (shown in FIG. 1).

The above-described abnormality diagnosis of the fuel cut failsafe function according to the second embodiment is performed by the microcomputer 11 as follows according to a fuel cut failsafe function abnormality diagnosis program shown in FIG. 4. The program is executed in a predetermined cycle during the ON period of the power supply to the microcomputer 11.

If the program is started, first in S201, it is determined whether the IG flag is ON, which indicates ON state of the ignition switch. If the IG flag is OFF, which indicates the OFF state of the ignition switch, it is determined that the abnormality diagnosis of the fuel cut failsafe function is prohibited, and the program is ended without executing subsequent processing.

If it is determined in S201 that the IG flag is ON, the process proceeds to S202, in which it is determined whether the current state is before the engine start. If the current state is not before the engine start, it is determined that the abnormality diagnosis of the fuel cut failsafe function is prohibited, and the program is ended without executing subsequent processing.

If both of S201 and S202 are YES, it is determined that the current state is in the fuel cut failsafe function diagnosis period, in which the abnormality diagnosis of the fuel cut failsafe function is permitted, and the process proceeds to S203. In S203, the fuel cut failsafe function monitoring execution flag is set to ON to activate the fuel cut failsafe function monitoring section 16.

Then, the process proceeds to S204, in which an abnormal test result is calculated in the test execution section 15, and the abnormal test result is sent to the abnormality determination section 22 of the abnormality monitoring device 21. Then, the process proceeds to S205, in which the abnormality determination section 22 determines whether the test result is abnormal. If it is determined that the test result is not abnormal, the program is ended without performing subsequent processing.

If it is determined in S205 that the test result is abnormal, the process proceeds to S206, in which a computer abnormality determination flag is set to ON, which indicates the abnormality in the microcomputer 11. In following S207, the fuel cut failsafe execution flag is set to ON to cause the abnormality determination section 22 to send the fuel cut failsafe function execution command signal to the fuel cut failsafe execution section 23. Thus, the fuel cut failsafe execution section 23 is caused to output the fuel cut failsafe signal to the injector driver 17 to stop the operation of the injector driver 17. The fuel cut failsafe function monitoring section 16 monitors the output level of the disablement port of the injector driver 17 at the time.

When the fuel cut failsafe function is normal, the output level of the disablement port becomes H level, and the disablement flag is set to ON. When the fuel cut failsafe function is abnormal, the output level of the disablement port does not change from L level, and the disablement flag is maintained at OFF.

In following S208, it is determined whether the fuel cut failsafe function is normal based on whether the disablement flag is ON. When the disablement flag is ON, it is determined that the fuel cut failsafe function is normal, and the abnormality flag is maintained at OFF in S209. When the disablement flag is OFF, it is determined that the fuel cut failsafe function is abnormal, and the abnormality flag is set to ON in S210. If the abnormality flag is set to ON, the start of the engine (energization to the starter) is prohibited.

A time chart of FIG. 5 shows an execution example of the above-described fuel cut failsafe function abnormality diagnosis program of FIG. 4. As shown in FIG. 5, the fuel cut failsafe function monitoring execution flag (FAILSAFE FUNCTION MONITORING FLAG in FIG. 5), the computer abnormality determination flag and the fuel cut failsafe execution flag (FAILSAFE EXECUTION FLAG in FIG. 5) are set to ON respectively immediately after the IG flag is switched from OFF to ON through the ON operation of the ignition switch. Thus, the test execution section 15 of the microcomputer 11 sends the abnormal test result to the abnormality determination section 22 of the abnormality monitoring device 21 to provide a state where the abnormality determination section 22 detects the abnormality in the microcomputer 11. Thus, the fuel cut failsafe execution section 23 of the abnormality monitoring device 21 is caused to output the fuel cut failsafe signal to stop the operation of the injector driver 17. Thus, the abnormality diagnosis of the fuel cut failsafe function is performed, and it is determined whether the fuel cut failsafe function is normal based on whether the disablement flag is ON. If it is determined that the fuel cut failsafe function is normal as the result, a start permission state is established promptly. If the driver performs the starting operation in this state, the starter (not shown) is energized promptly and the engine is started.

According to the above-described second embodiment, the test execution section 15 of the microcomputer 11 sends the abnormal test result to the abnormality determination section 22 of the abnormality monitoring device 21 to provide the state where the abnormality determination section 22 detects the abnormality in the microcomputer 11. Thus, the fuel cut failsafe execution section 23 of the abnormality monitoring device 21 is caused to output the fuel cut failsafe signal. Therefore, the second embodiment exerts an effect of additionally enabling determination of whether both of the test execution section 15 of the microcomputer 11 and the abnormality determination section 22 of the abnormality monitoring device 21 function normally when performing the abnormality diagnosis of the fuel cut failsafe function.

According to the fuel cut failsafe function abnormality diagnosis programs of FIGS. 2 and 4, the abnormality diagnosis of the fuel cut failsafe function is performed in the period since the ON operation of the ignition switch is performed until the engine start is commenced. The period for performing the abnormality diagnosis may be set arbitrarily in the period, in which the operation of the engine is stopped. Therefore for example, the abnormality diagnosis of the fuel cut failsafe function may be performed in a period, in which the main relay of the power supply circuit (not shown) is maintained at the ON state for a while after the engine stops (i.e., an ON period of the main relay after the engine stop).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A control device of an internal combustion engine, the control device comprising:

a microcomputer that controls at least a fuel injection device of the internal combustion engine; and an abnormality monitoring device that monitors an operation state of the microcomputer and that activates a fuel cut failsafe function by outputting a fuel cut failsafe signal to the fuel injection device to compulsorily stop fuel injection of cylinders when the abnormality monitoring device detects an abnormality in the microcomputer, wherein the microcomputer has a fuel cut failsafe function monitoring section that sets a fuel cut failsafe function diagnosis period in a period in which an operation of the internal combustion engine is stopped, that causes the abnormality monitoring device to output the fuel cut failsafe signal to the fuel injection device during the fuel cut failsafe function diagnosis period, and that monitors a signal state of an operation state monitoring port of the fuel injection device at the time, thereby performing abnormality diagnosis of the fuel cut failsafe function.

2. The control device as in claim 1, wherein the fuel cut failsafe function monitoring section sets the fuel cut failsafe function diagnosis period in a period since a switching-on operation of an ignition switch of the internal combustion engine is performed until start of the internal combustion engine is commenced.

3. The control device as in claim 1, wherein the fuel cut failsafe function monitoring section directs the abnormality monitoring device to output the fuel cut failsafe signal during the fuel cut failsafe function diagnosis period, thereby causing the abnormality monitoring device to output the fuel cut failsafe signal to the fuel injection device.

4. The control device as in claim 1, wherein the microcomputer has a test execution section that tests an operation of the microcomputer, and the fuel cut failsafe function monitoring section causes the test execution section to output an abnormal test result to the abnormality monitoring device during the fuel cut failsafe function diagnosis period to provide a state where the abnormality monitoring device detects the abnormality in the microcomputer thereby causing the abnormality monitoring device to output the fuel cut failsafe signal to the fuel injection device.

* * * * *